July 20, 1965     J. E. BURBANK     3,196,196
PROCESS AND APPARATUS FOR MOLDING ZIPPER FASTENERS
Filed March 12, 1962
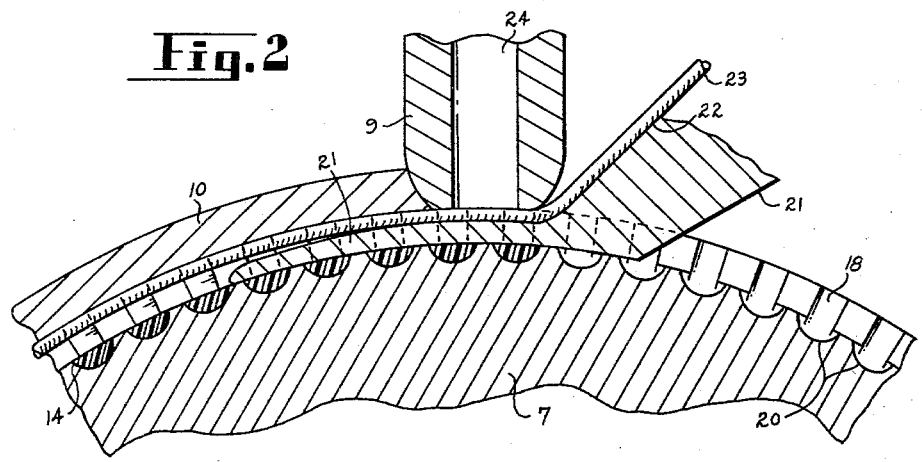
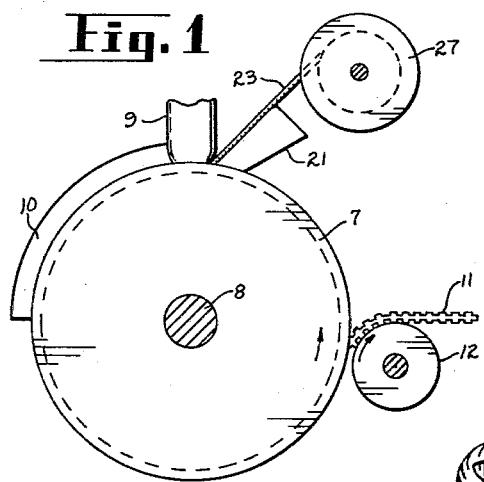
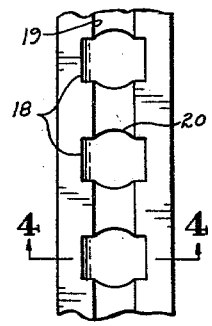
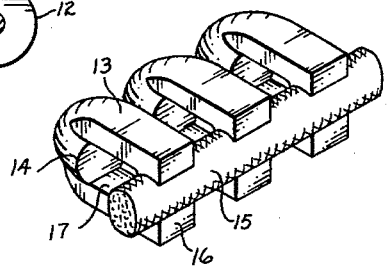
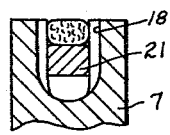
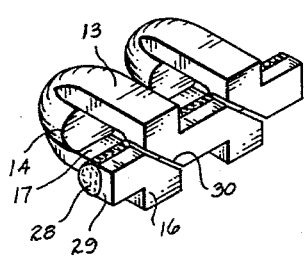
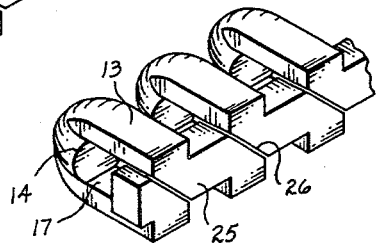
INVENTOR
John E. Burbank
BY
*H. F. Johnston*
ATTORNEY United States Patent Office 3,196,196
Patented July 20, 1965

3,196,196
PROCESS AND APPARATUS FOR MOLDING ZIPPER FASTENERS
John E. Burbank, Stamford, Conn., assignor to Scovill Manufacturing Company, Waterbury, Conn., a corporation of Connecticut
Filed Mar. 12, 1962, Ser. No. 178,913
4 Claims. (Cl. 264—251)

My invention relates to the making of zipper stringers, and particularly to an improved apparatus and process for molding from plastic material a continuous stringer with a series of flexibly connected individual fastener elements.

The invention has for one of its objects, the avoidance of molds consisting of numerous parts which have to be separated to free the finished stringer. Accordingly, my invention provides an improved process and apparatus utilizing a wheel with a solid periphery in which are formed the complete mold cavities for the fastener elements. An injection nozzle bears tightly against the periphery of the wheel and simultaneously with the injection, flexible connecting means are introduced. This may comprise in one embodiment a flexible textile cord fed under the nozzle or in another embodiment, merely plastic material flowing from the nozzle between the mold cavities which unite integrally the individual fastener elements. In still another embodiment, the flexible connecting means may include both a cord and plastic material.

In the wheel, the mold cavities are connected by a continuous groove around the wheel, and the interlocking portions consist of one or more hook-like projections extending beyond the body portion of the fastener element, and in accordance with my invention, these projections are substantially the same in width as the continuous groove or at least no greater than the width of such groove, so that the finished stringer can be removed radially from the wheel as soon as it is cool. Thus, no moving mold parts are required and the apparatus becomes relatively simple and inexpensive.

The fastener stringer produced is intended in most instances to be connected to a tape as by a sewing operation, with threads extending around or through the flexible connecting means between the fastener elements.

In the accompanying drawing, I have shown for purpose of illustration, one embodiment which my invention may assume in practice. In the drawing:

FIG. 1 is a diagrammatic view on a small scale of my improved apparatus and method;

FIG. 2 is a vertical central section through a portion of the apparatus on an enlarged scale;

FIG. 3 is a detail plan view of the wheel periphery;

FIG. 4 is a transverse sectional view along line 4—4 of FIG. 3;

FIG. 5 is a perspective view of a small section of the finished product;

FIG. 6 is a perspective view of another form of the finished product; and,

FIG. 7 is a perspective view of a third form of the fastener stringer made in accordance with the invention.

The mold wheel 7 is mounted to rotate on an axle 8, and an injection nozzle 9 fits tightly against the periphery of the wheel. The fastener stringer is formed in the periphery of the wheel by material injected through the nozzle 9, then passes under a cover plate or shoe 10 extending partly around the wheel, and the completed fastener stringer 11 is removed from the wheel by a suitable drum 12 which may grab the fastener stringer and pull it radially away from the wheel 7.

The details of apparatus and method will be best understood by referring first to the particular fastener which results. It consists of a series of individual fastener elements, each having a body portion 13 and a substantially narrower hook-like section 14 projecting beyond the body portion toward an adjacent fastener element. As shown in the drawings, each element has two such hook-like projections extending in opposite directions, but for many purposes, one such projection will make a good fastener.

The elements 13 in FIG. 5 are flexibly connected to a textile cord 15 which extends substantially to the base or heel 16 of the fastener element, and each element also has a hole 17 between the hook-like projections 14 and cord 15.

The mold cavities 18 are formed in the solid periphery of the wheel 7 and of course, are shaped and spaced in conformity with the fastener elements which have been described. Each mold cavity may be described as having solid inseparable walls; in other words, the result is a "one-piece" mold instead of two or more pieces which must be separated to remove the finished product. The mold cavities 18 are connected by a groove 19 extending continuously around the wheel and of course, opening to the periphery of the wheel. This groove extends to those portions 20 of the mold cavities which form the hook-like projections 14 and of course, this groove must be at least as wide as the projections 14 to permit removal of the finished product, whereas the main portion of each mold cavity is substantially wider so as to form the body portions 13 of the fastener elements.

A stationary core 21 fits snugly in the bottom portion of the groove 19 as seen in the sectioned FIG. 4, and extends over several mold cavities 18 in the direction of rotation of the wheel 7. The core may have an angular top surface 22 to provide a guide for a cord 23 which is fed into the space between the core 21 and nozzle 9. The cord 23 can be supplied from any suitable source, such as the reel 27 indicated in FIG. 1. The cord 23 is crowded tightly into this space so it will fill the same so as to prevent any substantial amount of the injected material from flowing around the cord between the mold cavities. The orifice 24 in the nozzle 9, of course, registers with the mold cavities 18 and may be large enough to embrace portions of two cavities so that the flow will not be interrupted between the mold cavities.

The cover plate 10 fits against the nozzle and preferably snugly against the periphery of the wheel. If desired, it may be water-cooled so as to solidify the plastic material as soon as possible after it is formed in the mold cavities. In this process, if there is some plastic material which flashes along the cord between the fastener elements, it may be either removed or in most cases, it will not be objectionable and may even be advantageous in providing greater holding power of the fastener elements on the cord 15.

In the modified form of the process and apparatus to produce the stringer of FIG. 6, the flexible connecting means is introduced at the nozzle by material flowing through the nozzle into that portion of the groove 19 above the core 21. This core is desirable in either case in order to form the holes 17 in the fastener elements and into which the hook-like projections of a mating fastener element may engage. In FIG. 6, these integral flexible connectors are designated as 25 and in order to increase flexibility, diagonal slots 26 may be cut through to the openings 17.

In FIG. 7, the flexible connecting means between the fastener elements may consist of both a cord 28 and comparatively thin sections of plastic material 29. Again, in order to increase flexibility, slots 30 may be cut through the material covering the cord 28 along diagonal lines from one side of each fastener element to the other. In this form of the product, the cord strengthens the fastener against endwise stretching and at the same time, the anchorage of the fastener elements to the cord is extremely strong.

What I claim is:

1. Apparatus for molding a continuous zipper stringer with a series of flexibly connected individual fastener elements, each element having a body portion and a substantially narrower hook-like section projecting beyond said body portion toward an adjacent fastener element, which comprises the combination of
    (a) a rotating wheel having a solid periphery, a series of mold cavities formed in and around the periphery thereof spaced apart in accordance with the desired spacing of the fastener elements in said stringer, each cavity having solid inseparable walls conforming in shape to the exterior shape of an individual fastener element, and an outwardly opening groove extending continuously around said wheel through said mold cavities, said groove having such depth that it extends to said hook-like sections and a width at least as great as that of said hook-like sections;
    (b) a nozzle having its outlet end fitting tightly against the periphery of said wheel and whose orifice registers with said mold cavities and groove; and,
    (c) a stationary core fitting the lower portion of said groove and extending from said nozzle a substantial distance in the direction of rotation of said wheel.

2. An apparatus as defined in claim 1 having in association with said core, means for guiding a cord into said continuous groove of the rotating wheel and under the outlet end of the nozzle.

3. A process for making a continuous zipper stringer with a series of flexibly connected individual zipper elements, each element having a body portion and a substantially narrower hook-like section projecting beyond said body portion toward an adjacent fastener element, which process consists of
    (a) rotating a wheel having a solid periphery with mold cavities opening through the periphery of the wheel, each mold cavity conforming in shape to one of said zipper elements, said mold cavities being connected by a groove with a stationary nozzle fitting tightly against the wheel periphery on opposite sides of said groove;
    (b) injecting plastic material into the mold cavities through said nozzle as the wheel rotates in line with a stationary core which fits in the bottom portion of said groove;
    (c) simultaneously with such injection, introducing a continuous flexible cord within said groove between said core and said nozzle; and,
    (d) withdrawing such flexibly connected fastener elements from the periphery of said wheel without opening said mold cavities in a lateral direction.

4. A process as defined in claim 3 in combination with the subsequent step of cutting through the plastic material covering said cord along diagonal lines from one side of each fastener element to the other.

References Cited by the Examiner

UNITED STATES PATENTS

| | | | |
|---|---|---|---|
| 2,074,368 | 3/37 | Corner | 18—59 XR |
| 2,282,308 | 5/42 | Dahlin | 18—59 |
| 2,368,316 | 1/45 | Meitner | 18—59 XR |
| 2,865,046 | 12/58 | Bird | 18—21 XR |

FOREIGN PATENTS 542,364  1/42  Great Britain.

ROBERT F. WHITE, *Primary Examiner.*

MORRIS LIEBMAN, *Examiner.*